United States Patent [19]

Baker

[11] Patent Number: 5,155,443
[45] Date of Patent: Oct. 13, 1992

[54] MACHINE FOR INSPECTING THE WALL THICKNESS OF GLASS CONTAINERS

[75] Inventor: Russ J. Baker, Horseheads, N.Y.

[73] Assignee: Emhart Industries, Inc., Towson, Md.

[21] Appl. No.: 630,070

[22] Filed: Dec. 19, 1990

[51] Int. Cl.⁵ .................. G01R 35/00; G07C 3/00; B07C 5/00
[52] U.S. Cl. .................. 324/662; 209/522; 377/15
[58] Field of Search .......... 364/473, 507; 209/522, 209/551; 324/671, 662, 690; 377/15

[56] References Cited

U.S. PATENT DOCUMENTS

| | | | |
|---|---|---|---|
| 2,790,602 | 4/1957 | Jeppson | 377/15 |
| 3,916,123 | 10/1975 | Werner et al. | 377/15 |
| 4,593,369 | 6/1986 | Thompson | 377/16 |
| 4,639,875 | 1/1987 | Abraham et al. | 377/15 |
| 4,667,336 | 5/1987 | Best | 377/15 |
| 4,968,899 | 11/1990 | Katsutani et al. | 377/15 |
| 4,996,658 | 2/1991 | Baker | 209/522 |

Primary Examiner—Kenneth A. Wieder
Assistant Examiner—Maura K. Regan
Attorney, Agent, or Firm—Spencer T. Smith

[57] ABSTRACT

Signal errors generated in a channel of a wall thickness inspecting machine are detected and counted to determine whether the channel should be turned off.

2 Claims, 4 Drawing Sheets

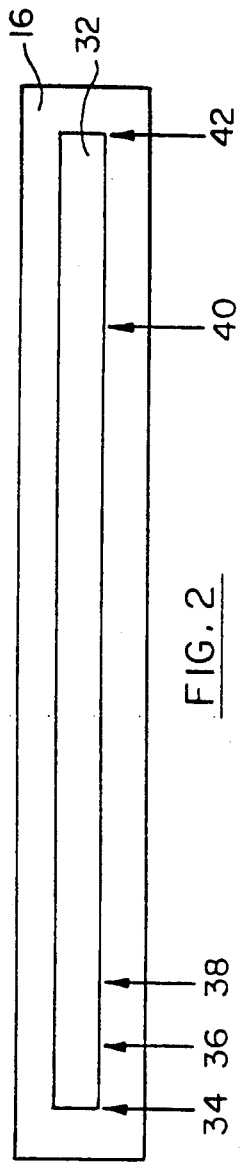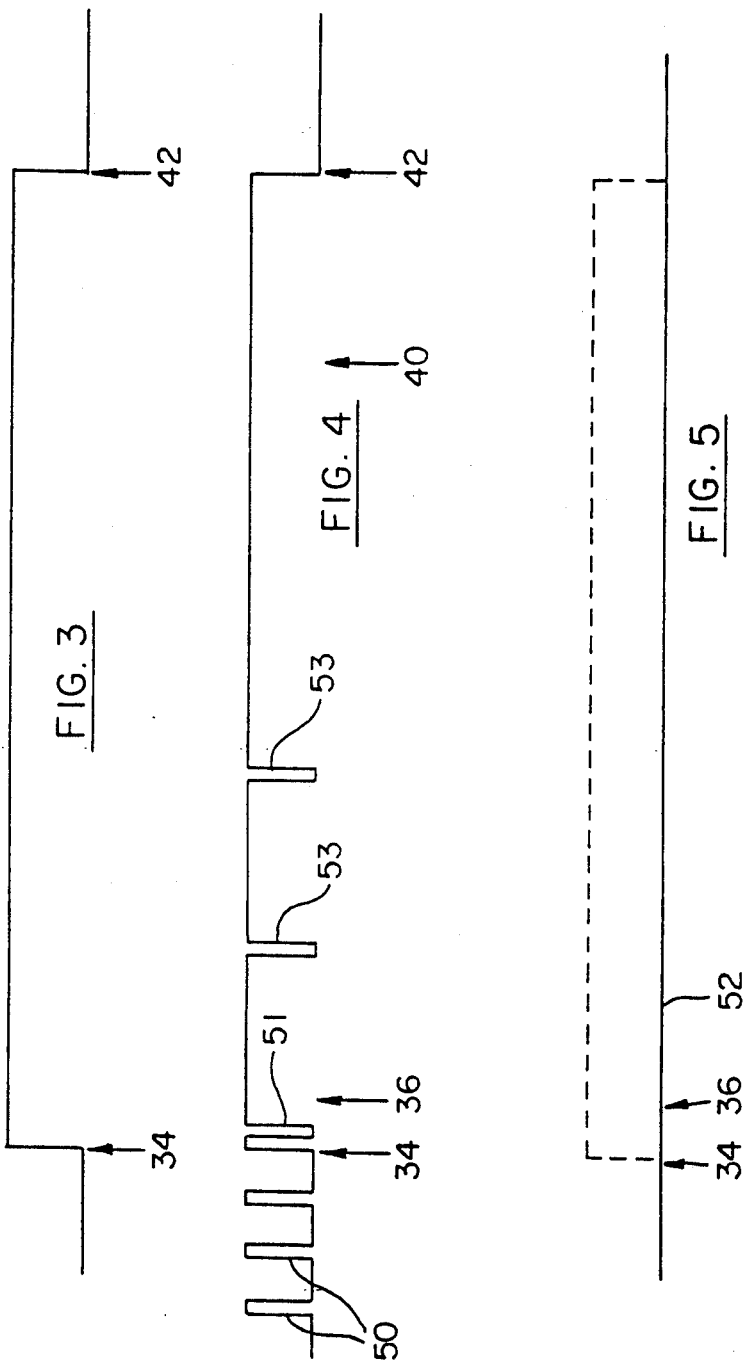

MACHINE FOR INSPECTING THE WALL THICKNESS OF GLASS CONTAINERS

The present invention relates to equipment for inspecting the thickness of a glass container by evaluating sampled voltage data generated by elongated capacitance strips as the glass container is rolled along the strips.

A bottle or container is formed from a gob of molten glass in an individual section glass container forming machine by first pressing or blowing the gob into a parison and then blowing the parison into the container. When glass is uniformly distributed in this process, wall thickness will be uniform, but when glass distribution is not uniform, thin spots can occur which may result in bottle failure during filling or handling.

The high dielectric constant of glass makes it possible to measure the electrical capacitance of the wall of a glass container located against two elongated electrodes of a sensor which contact the bottle as it is rolled along the sensor. This capacitance increases monotonically as the thickness of the glass container increases and can be measured using an electronic circuit to convert the capacitance to a voltage. A voltage representative of the thickness of the wall can be continuously generated as the bottle rolls along the sensor, and if the voltage decreases below a selected value (the value which represents the minimal wall thickness), the bottle being tested can be rejected. Each sensor is a part of a discrete data channel.

Conventionally three or four data channels are utilized to inspect a glass container and the voltage outputted from each channel is evaluated. Random errors in any channel can cause rejection of the glass container being inspected and failure of a single channel may result in the improper rejection of numerous glass containers.

It is accordingly an object of the present invention to provide a system for detecting channel errors so that glass containers will not be improperly rejected and so that a faulty channel can be removed from the inspection system.

Other objects and advantages of the present invention will become apparent from the following portion of this specification and from the accompanying drawings which illustrate in accordance with the mandate of the patent statutes a presently preferred embodiment incorporating the principles of the invention.

Referring to the drawings:

FIG. 2 is a front view of the head of an oscillator assembly of the machine shown in FIG. 1;

FIG. 3 is a representation of the signal theoretically generated by the head;

FIG. 4 is a representation of a possible actual signal generated by the head;

FIG. 5 is a representation of a failed channel input signal;

Figure 1:
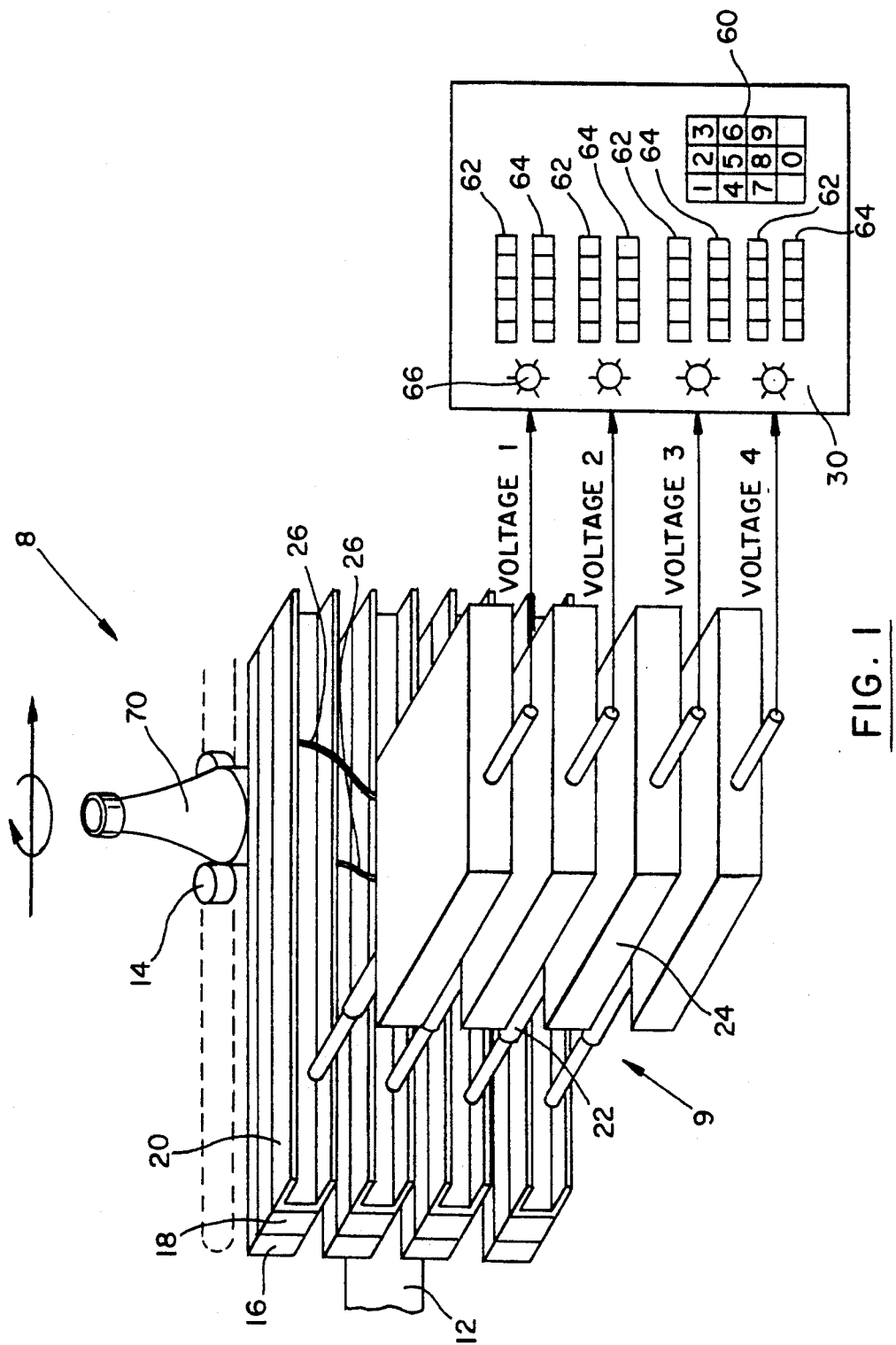
FIG. 1 is an oblique view of a portion of a test station for a glass container inspecting machine.
Figure 6:
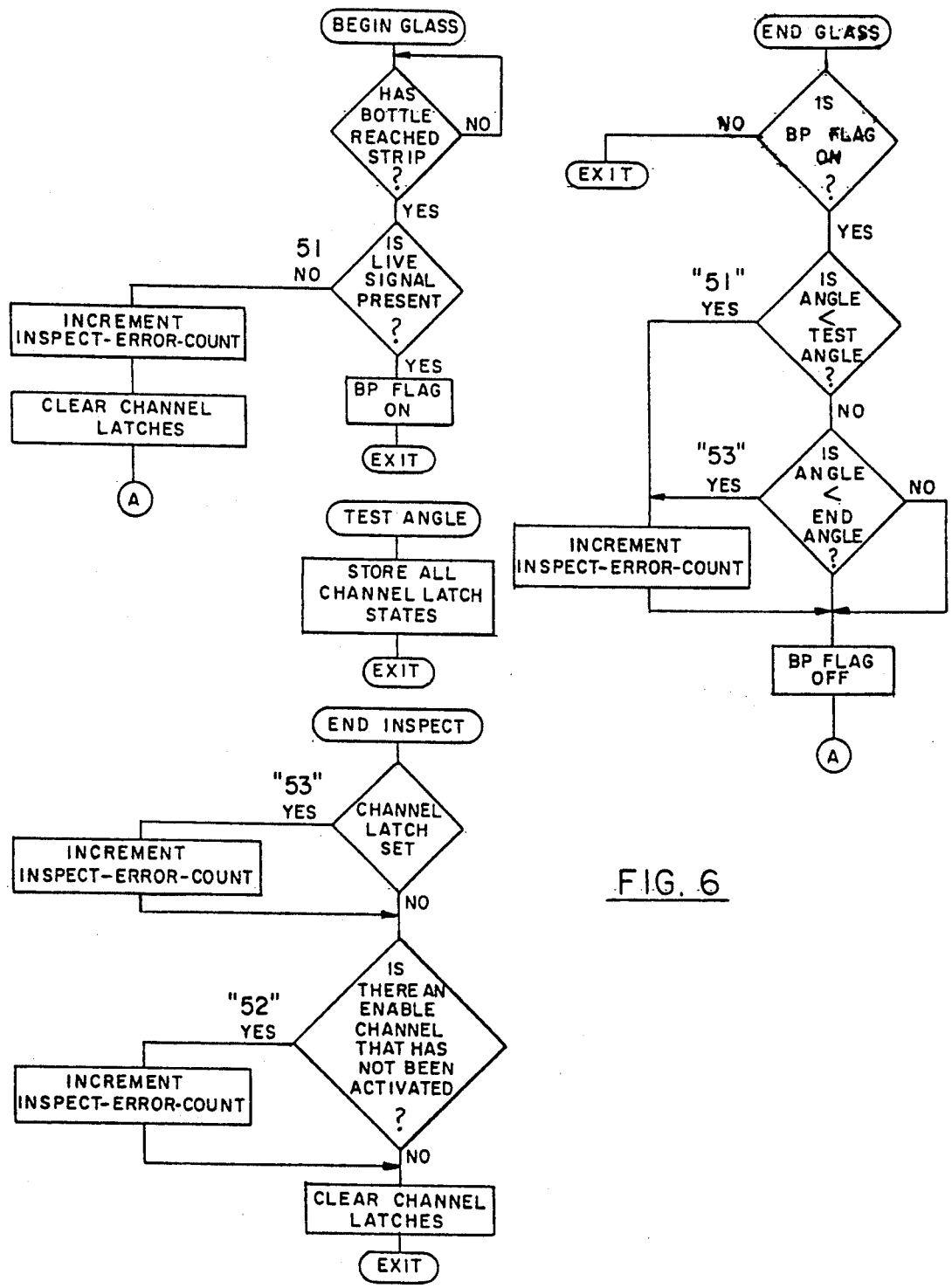
FIG. 6 is a logic diagram for the error evaluation of errors to be captured by latching devices.

The glass container inspection machine 8 has a station for testing a round bottle 70 which is supported by a support plate 12 and which is advanced along the support plate 12 by a bottle carrier 14. During its displacement past the test station, the carrier 14 forces the bottle against a parallel, horizontally extending and vertically spaced capacitance sensing strips 16 which are secured to resilient foam strips 18 mounted on suitable brackets 20. The brackets are connected by posts 22 to corresponding oscillator assemblies 24 which receive a capacitance signal via calibrated cables 26 and generate voltage signals which are supplied to the computer. Each head oscillator assembly is part of a discrete data channel.

In operation, a glass container which is being conveyed along a path parallel to the strip will engage the strip 32 (FIG. 2) at the leading edge 34 and the channel should develop a voltage signal representative of the wall thickness of the glass container at that time. A test angle location 36 is selected at a point where a voltage signal will be consistently generated and the presence of a signal at this location confirms the presence of a bottle. Inspection starts at a begin test location 38 adjacent to the test angle and ends at a end test location 40 short of the end 42 of the capacitance strip (off angle).

FIG. 3 illustrates the theoretical digital voltage signal generated by a bottle engaging this strip. The inspection channel should be inactive (a signal should be absent) before the bottle engages the strip and after it leaves the strip and should be active (a signal should be present) during engagement.

The first error that may occur is the false bottle present error 50 (FIG. 4) where a signal is generated indicating that the bottle is present before the bottle engages the strip. At glass present time 34 (FIG. 4) if no live bottle present signal is present then the latched channel is in error. This will detect error pulse 51 (FIG. 4). The error is logged and the inspection is abandoned. If the bottle present signal is present then it is logged, a bottle present flag is set (bpflag) and the inspect cycle is started.

At test angle 36 (FIG. 4) all active latches are stored for comparison at end inspect 40 (FIG. 4) and end of glass present 42 (FIG. 4). The latches are then cleared.

At end inspect 40 (FIG. 4) if any channel latch has been set, it indicates that the channel went inactive and active again during bottle present. This will detect error pulses 53 (FIG. 4). This is an error condition and will be logged as such. If there is an enabled channel that has not gone active 52 (FIG. 5) it will now be detected as an error by evaluating the channel latches and the stored channel latch information at test angle 36 (FIG. 4). The latches are now cleared.

It is important to note that when there is only one channel in use that error pulses 51 and 53 (FIG. 4) will effectively signal end of glass before its normal time. This design will capture these errors as well.

At end glass 42 (FIG. 3) if there is not a logged bottle present (bpflag set at begin glass 34 FIG. 3) then it will ignore the bottle and allow the begin glass to process the error. If the angle is less than test angle it will determine which channel was in error. This will capture error pulse 51 (FIG. 4) which is of longer duration than those captured at begin glass. If the angle is between test angle and end angle the channel in error will be determined. This will capture error pulses 53 (FIG. 4).

Figure 7:
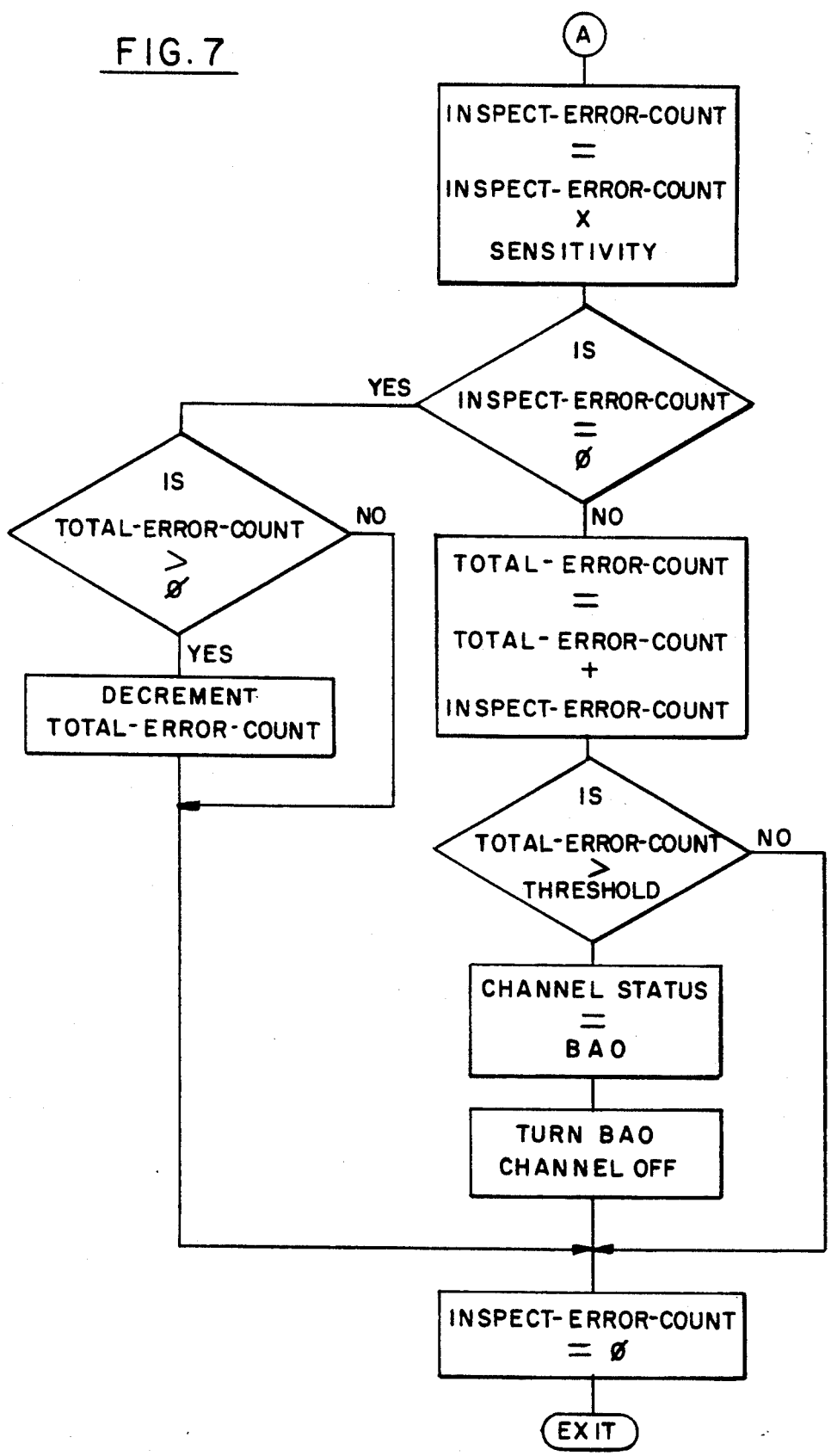
FIG. 7 is a logic diagram illustrating the testing algorithm for this machine.

When the inspection cycle is complete (FIG. 7) the controller will add up the latched errors and the other errors (bottle not present at test angle, for ex.). If there are no errors in the cycle "1" will be subtracted from the current error count. If there are errors, the total will be multiplied by the sensitivity factor (which the operator inputs into the controller for each channel via the controller terminal 60 and the display 62 of that number is automatically shown in FIG. 1. This number is then added to the current error count and if it exceeds the threshold number (which is also inputted by the operator via the terminal and displayed 64) the controller turns of the channel and signals this condition (signalling is schematically illustrated as warning lights 66).

I claim:

1. A machine for inspecting the thickness of a glass bottle comprising
    an elongated capacitance strip,
    means for rolling a glass bottle along said strip,
    means for generating a voltage signal representative of bottle wall thickness as the bottle is rolled along said strip,
    means for evaluating said voltage signal so that an inspected bottle can be accepted or rejected,
    means for enabling said evaluating means including
        means for latching a voltage signal as it goes from zero to high,
        means operative when a voltage signal is latched to verify the presence of a bottle present signal,
        means for clearing said latching means in the event said verify means fails to verify the presence of a bottle present signal and
        means for preventing the operation of said verifying means until the bottle rolls off of said strip.

2. A machine according to claim 1, further comprising
    second means for latching a voltage signal as it goes from zero to high during the evaluation of said voltage signal by said evaluating means,
    counting means for counting the number of errors per cycle including
        the total number of signals latched by said first latching means plus one in the event said second latching means is latched,
    total count means for summing the total number of errors and deleting a predetermined number in the event said counting means counts zero in a cycle and
    means for stopping said evaluating means when said total count means counts to a predetermined number.

* * * * *